L. CHEVROLET.
SPEED CHANGING MECHANISM.
APPLICATION FILED JUNE 18, 1908.
919,538.
Patented Apr. 27, 1909.
2 SHEETS—SHEET 1.
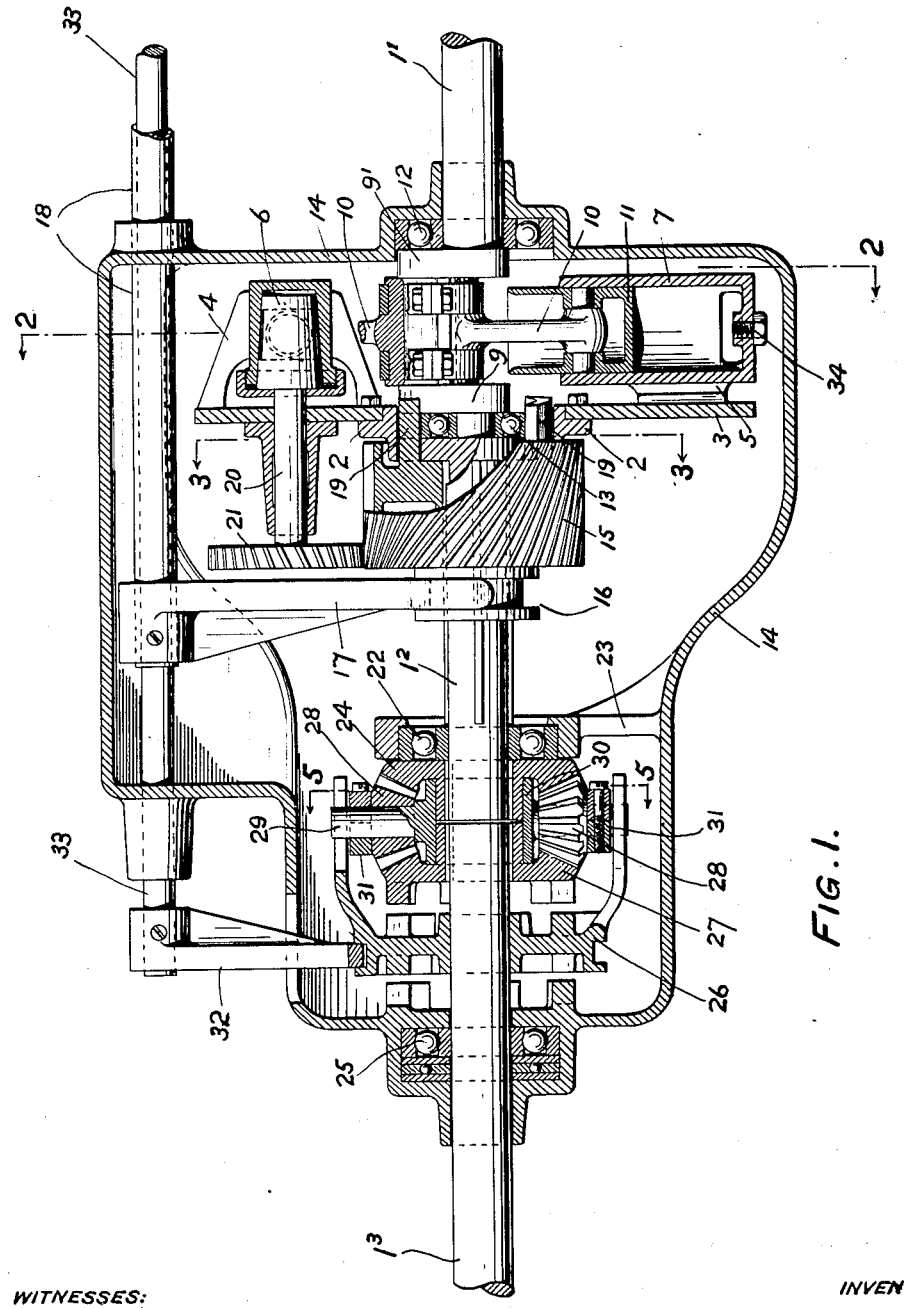
FIG. I.
WITNESSES:
William Phillips Jr.
L. Berger.
INVENTOR
Louis Chevrolet.
BY
H. B. Schermerhorn
ATTORNEY.

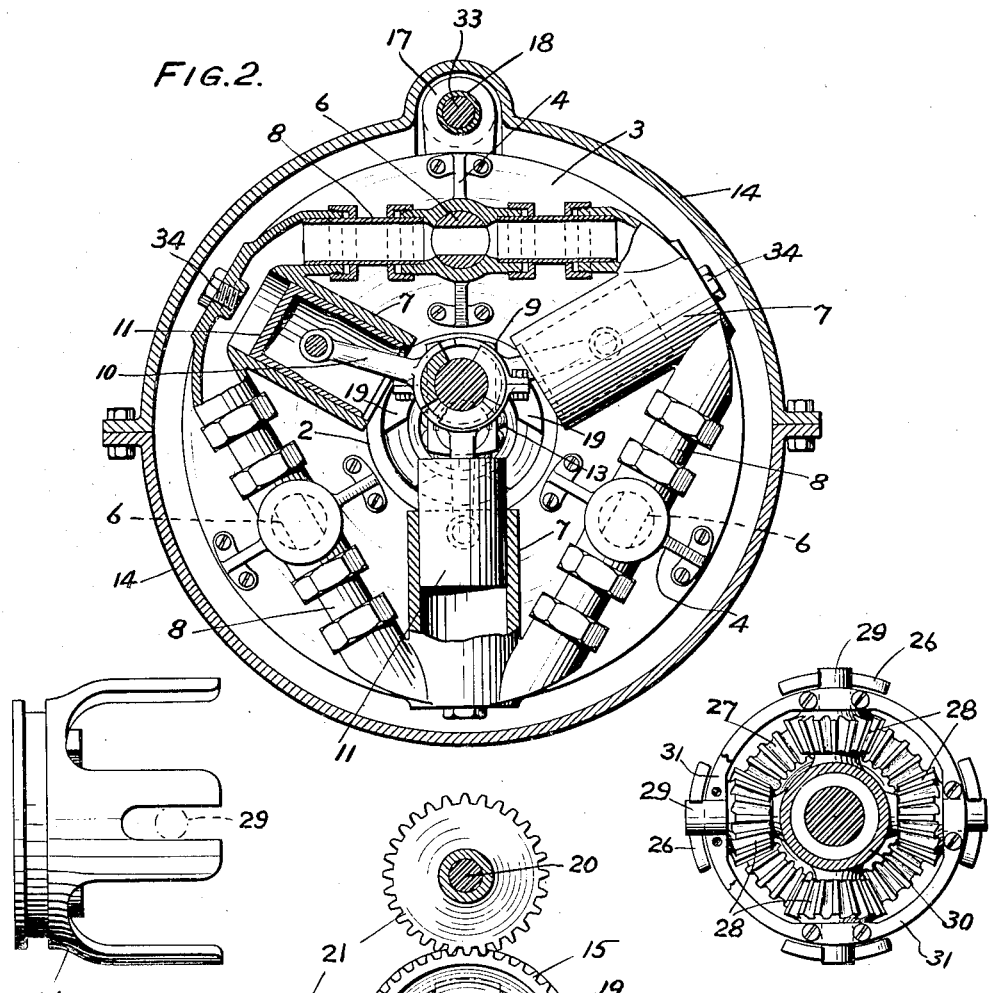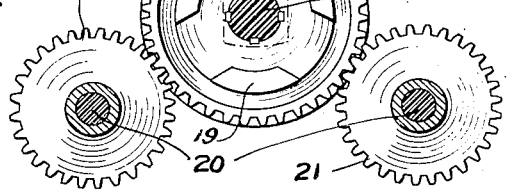

UNITED STATES PATENT OFFICE.

LOUIS CHEVROLET, OF PHILADELPHIA, PENNSYLVANIA.

SPEED-CHANGING MECHANISM.

No. 919,538.      Specification of Letters Patent.      Patented April 27, 1909.

Application filed June 18, 1908. Serial No. 439,152.

*To all whom it may concern:*

Be it known that I, LOUIS CHEVROLET, a citizen of Switzerland, residing at 5721 Commerce street, Philadelphia, Pennsylvania, have invented a new and useful Speed-Changing Mechanism, of which the following is a specification.

My invention relates to speed changing mechanisms and my object is to provide a mechanism for this purpose which will enable me to transmit to the driven section of the shaft either the full rate of revolution of the driving shaft or any desired lesser rate thereof, and which will enable me to obtain a like gradation of rate of revolution upon the reverse.

In the majority of speed transmission mechanisms for automobile use there are, for example, three speeds—a low, an intermediate and a high speed—each speed being obtained by bringing its own set of gears into positive contact with the power shaft. But in these cases we pass from a state of rest to the low speed, from the low to the intermediate and from the intermediate to the high speed, and no gradations of speed between these fixed rates is obtainable.

My object is to provide a means whereby a finer gradation of speed transmission may be obtained upon both forward and reverse movements. This I accomplish by the means hereinbelow described and shown in the accompanying drawings, in which—

Figure 1 is a longitudinal section of the entire mechanism. Fig. 2 is a section on the line 2—2, Fig. 1. Fig. 3 is a section on the line 3—3, Fig. 1. Fig. 4 is a detail view of the reverse clutch member, and Fig. 5 is a section on the line 5—5, Fig. 1.

In Fig. 1 the power shaft is divided, for the purposes of description, into the sections $1^1$, $1^2$ and $1^3$. Section $1^1$, the driving section, of the shaft extends from the right-hand side of the drawing, as coming from the engine or motor, to a point bisected by the section line 3—3. Section $1^2$, a driven section of the shaft, extends from the point crossed by the section line 3—3 to the reverse mechanism. Section $1^3$, the remaining driven section of the shaft, extends from the reverse mechanism onward to the left-hand side of the drawing where it connects, in the case of automobile use, with the differential.

The right-hand end, as shown in Fig. 1, of section $1^1$ of the power shaft terminates in the head 2 to which is secured the annular plate 3. To the annular plate 3 are secured a series of brackets 4, 5 which support the valves 6, cylinders 7 and connecting tubing 8 which form part of the speed changing mechanism. The connecting tubing 8 has been omitted from Fig. 1 for the purpose of showing other parts, but it is shown clearly in Fig. 2. Section $1^1$ of the power shaft is cranked as at 9; $9^1$ to carry the piston rods 10 and trunk pistons 11 which are mounted in the cylinders 7 above described.

By reference to Fig. 2 it will be seen that the cylinders 7 are connected by the tubing 8 which forms a continuous inter-communication between said cylinders, each length of tubing between cylinders being controlled by a valve 6; and by a comparison of Figs. 1 and 2 it will be seen that the entire system of inter-communicating cylinders, tubing and valves is mounted upon and secured to the annular plate 3 by the brackets 4, 5 hereinabove described.

Section $1^1$ of the power shaft is mounted in the bearings 12 and 13, the inner race of the bearing 12 being secured to the shaft and the outer race to the gear casing 14. In like manner the inner race of the bearing 13 is secured to the left-hand end of section $1^1$ of the power shaft, while the outer race is secured in the enlarged head 2 of section $1^2$ of the power shaft.

The spirally geared drum 15, Fig. 1, is splined upon section $1^2$ of the power shaft and is slidable thereon by means of the collar 16, which is integral with said drum, the clutch arm 17 and clutch rod 18. The drum 15 is furnished with the clutch pins 19, one of which is shown in section in Fig. 1 and one in perspective. These clutch pins are adapted to enter clutch seats in the enlarged head 2 of section $1^2$ of the power shaft, and a seat for any one of said clutch pins is provided in the end of crank 9 of section $1^1$ of the power shaft, as shown in Fig. 1. The ends of these clutch pins, three in number, are shown in Fig. 3.

The valves 6 in the tubing 8 are controlled, as shown in Fig. 1, by the valve-stems 20 and gears 21, the latter meshing with the spirally geared drum 15. One of these valves, with its stem and gear, is shown in detail in Fig. 1, and the three valve stems, gears and the drum into which the latter mesh are shown in Fig. 3.

I will now describe the mode of operation of that portion of the mechanism the component parts of which have been hereinabove set forth. By reference to Fig. 2 it will be seen that a continuous, inter-communicating passageway is formed by the tubing 8 which connects the open heads of the cylinders 7. This continuous passageway is filled with a suitable fluid, such as glycerin or a heavy cylinder oil, openings being provided for this purpose on the center of each cylinder head, said openings being closed by the cap screws 34. A suitable opening (not shown) being provided in the gear casing 14, the annular plate 3 is rotated until one of the screw capped openings 34 into the passageway is brought opposite the opening in the gear casing, when the cap screw 34 is removed, the passageway filled and the cap screw replaced. In Fig. 2 the valves 6 controlling the tubing sections of said continuous passageway are shown fully opened. If, now, the crank shaft be revolved an alternating rise and fall of the trunk pistons takes place in their respective cylinders, little or no resistance being offered thereto by the oil, which flows freely to and fro through the passage-way as impelled by the stroke of the pistons. But as soon as the valves are partially closed, by semi-rotation in their valve seats, a proportionate obstruction is offered to the free flow of the oil which in turn resists the free stroke of the pistons until, when the valves are completely closed, the movement of the pistons is completely checked.

Referring now to Fig. 1, and omitting for the moment any consideration of the function of the spirally geared drum 15 with its clutch pins 19, it will be seen that a complete closure of the valves 6 results in transmitting the full rate of revolution of section $1^1$ of the power shaft to section $1^2$ thereof, the annular plate 3 together with the entire system of cylinders, pistons, and tubing thereon rotating in this case en bloc. If the valves 6 are now partially opened, allowing an impeded circulation of oil in the passageway, the full rate of revolution of section $1^1$ of the power shaft is no longer transmitted to section $1^2$ thereof, since two movements instead of one are now taking place in the mechanism shown in Fig. 2, namely, a slow stroke of the trunk pistons in their cylinders combined with a revolution of the annular plate 3 with the cylinders, tubing and valves thereon. The rate of revolution of the annular plate 3 and consequently of section $1^2$ of the power shaft to which it is secured will be somewhat less than that of section $1^1$ of the power shaft, in consequence of the slow stroke of the trunk pistons 11 which by their motion prevent the full rate of revolution of section $1^1$ of the power shaft from being transmitted to section 2 thereof as was the case when the valves 6 were completely closed, allowing no stroke in the pistons and causing the annular plate with its mechanism to rotate as a solid mass, as above described.

In view of the foregoing explanation it will be apparent that the highest speed is obtained when the valves 6 are closed, and that in proportion as they are opened the freedom of circulation of oil in the passageway is increased, lessening the resistance to the stroke of the pistons and decreasing the rate of rotation of the annular plate 3. When the valves 6 are fully opened and the flow of oil in the passageway is unrestricted, no resistance is offered to the stroke of the pistons and consequently no rotatory impulse is imparted to the annular plate 3 nor to section $1^2$ of the power shaft. It is thus apparent that by either partially or wholly opening or closing the valves 6 I am enabled to maintain section $1^2$ of the power shaft in a state of rest, to set it in revolution, and to increase the rate of revolution by any desired gradation up to the speed of section $1^1$ of the power shaft. By reference to Fig. 2 it will be seen that each of the pistons 11 is at a different point of its stroke, the rise and fall being counterbalancing. It thus results that the total space for circulation of oil in the intercommunicating passageway and in the cylinder heads is always the same, the freedom of circulation only being restricted by semi-rotation of the valves 6.

I will now describe the means whereby the valves 6 are actuated. The spirally geared drum 15 with its collar 16 is splined upon section $1^2$ of the power shaft, as hereinbefore described, and is adapted to slide thereon through the agency of the clutch arm 17 and clutch rod 18. The drum 15 meshes with the gears 21 on the valve stems 20. In the position of parts shown in Fig. 1 the valves 6 are closed. If now the drum 15 is retracted on the shaft this movement operates to semi-rotate the gears 21 and to proportionately open the valves 6. The length of the drum 15 or the pitch of the gears thereon may readily be determined in practice with reference to the dimensions of the valves and passageway, so as to afford the requisite gradation in opening or closing the valves.

The object of the clutch pins 19 with which the drum 15 is furnished is as follows: When the valves 6 are shut, the full rate of revolution of section $1^1$ of the power shaft, i. e. the high speed, is transmitted to section $1^2$ thereof, as hereinbefore described, the pistons being rigid in their cylinders. While it is entirely feasible to run on the high speed in this manner, I desire to avoid the consequent strain upon the speed changing mechanism. When, therefore, the high speed is required, the drum 15 is moved by the clutch mechanism into the position shown in Fig. 1. As the valves close by this movement of the drum, the clutch pins 19 pass through seats in the enlarged head 2 and one of said pins enters a seat in the end of crank 9. This position of parts affords a direct and positive power transmission from section $1^1$ to section $1^2$ of the power shaft, distinct from although coöperating with the power transmission through the annular plate 3.

Having set forth the means whereby the desired variations in speed transmission are secured, I will now describe the means whereby a reverse revolution of section $1^3$ of the power shaft is obtained. In Fig. 1 the left-hand end of section $1^2$ of the power shaft is mounted in the bearing 22 in a suitable supporting bracket 23 integral with the gear casing 14, and is furnished with the bevel gear 24, keyed upon the end thereof. Section $1^3$ of the power shaft is mounted in the bearing 25 at the point where the shaft passes through the gear case, and is furnished with the fingered clutch member 26 which is mounted free on the shaft, and the bevel gear 27, which is keyed upon the end of the shaft. Between the bevel gears 24 and 27 are arranged the pinions 28, the shafts 29 whereof are mounted in the annular bearing 30 and are furnished with the thrust collars 31. The fingers of the clutch member 26, which is shown in detail in Fig. 4, are slotted to engage the heads of the pinion shafts 29, allowing the latter to turn freely therein, and the body of the clutch member 26 is double-faced, being provided with clutch pins on each face, the pins on the left-hand face, as in Fig. 1, being adapted to enter seats formed on the interior of the gear case while the pins on the right-hand face are adapted to enter seats in the bevel gear 27. The clutch member 26 is actuated by the clutch arm 32 and clutch rod 33.

While the clutch member 26 is in the position shown in Fig. 1 no transmission of power can take place from section $1^2$ to section $1^3$ of the power shaft and consequently section $1^3$ of the power shaft is at rest. For while the revolution of bevel gear 24 is actuating the pinions 28, the latter cannot actuate bevel gear 27 since the clutch member 26 being free on the shaft allows the pinions 28 to turn freely about the power shaft. To transmit the forward speed to section $1^3$ of the power shaft the clutch member 26 is brought into engagement with the clutch face of bevel gear 27. Since the fingers of the clutch member 26 control the shafts of the pinion 28 this locking of the clutch member 26 prevents the pinions 28 from turning about the power shaft and the revolution of the pinions 28 is consequently transmitted positively to bevel gear 27, which causes sections $1^3$ and $1^2$ of the power shaft to revolve in the same direction and at the same rate of speed.

In order to effect a reverse revolution of section $1^3$ of the power shaft the clutch member 26 is moved to the left and is locked in the clutch seats formed on the interior of the gear casing adjoining the bearing 25. In this position the fingers of the clutch member 26 still control the shafts 29 of the pinions 28 and since the latter are by this means prevented from rotation around the power shaft, they positively transmit a reverse revolution to bevel gear 27, thus causing section $1^3$ of the power shaft to revolve at the same rate of speed but in a direction of revolution the reverse of that of section $1^2$ of the power shaft. I desire to direct attention to a further feature of my invention as an entirety, namely, it is equally operative in all respects whether section $1^1$ or section $1^3$ be taken as the driving section of the power shaft.

While I have shown and described my invention as primarily designed and employed for automobile use, I do not in any sense confine myself to such use as it is manifestly open to a far more general mechanical application.

What I claim as my invention and desire to secure by Letters Patent is—

1. A two-section shaft and means for varying the rate of revolution of the second section relatively to that of the first; said means consisting of a frame secured to said second section cylinders carried thereby having a valved inter-communication, piston heads in said cylinders cranked to said first section, a gear splined upon said second section and gears engaged therewith adapted to actuate said valves, and means for sliding the gear on said second section substantially as described.

2. A two-section shaft and means for varying the rate of revolution of the second section relatively to that of the first; said means consisting of a plate secured to one end of said second section, cylinders carried thereby having a valved inter-communication, piston heads in said cylinders cranked to said first section, a spiral gear splined upon said second section and gears engaged therewith on the valve-stems of said valves, and means for sliding said spiral gear upon said second section, substantially as described.

3. A two-section power shaft and means for varying the rate of revolution of the second section relatively to that of the first, said means consisting of an annular plate secured to one end of said second section cylinders having a valved inter-communication, trunk-pistons in said cylinders cranked to said first section, a spirally geared drum splined upon said second section and gears engaged therewith on the valve-stems of said valves, and means, comprising a clutch collar, arm and rod, for sliding said spirally geared drum upon said second section, substantially as described.

4. A power-shaft formed in two sections $1^1$ and $1^2$, and means for varying the rate of revolution of section $1^2$ relatively to that of section $1^1$; said means consisting of an annular plate secured to one end of section $1^2$, a plurality of cylinders equidistantly spaced upon and secured to said annular plate and having a valved inter-communication, trunk-pistons mounted in said cylinders and cranked to section $1^1$, a spirally geared drum splined upon section $1^2$ and gears engaged therewith on the valve-stems of said valves, and means, comprising a clutch collar, arm and rod, for sliding said spirally geared drum upon section $1^2$, substantially as described.

5. A power-shaft formed in two sections $1^1$ and $1^2$, means for varying the rate of revolution of section $1^2$ relatively to that of section $1^1$; said means consisting of a head formed upon the meeting end of section $1^2$, an annular plate secured to said head, cylinders secured to said plate and having a valved communication each with other, trunk-pistons mounted in said cylinders and cranked to section $1^1$, a spirally geared clutch splined upon section $1^2$ and gears engaged therewith actuating said valves, means, comprising a clutch collar, arm and rod, for sliding said spirally geared clutch upon section $1^2$, and means for positively locking sections $1^1$ and $1^2$ of the power shaft, said means consisting of clutch seats through the head on the end of section $1^2$ and a clutch seat in the crank of section $1^1$ and clutch pins on said spirally geared clutch adapted to enter said clutch seats, substantially as described.

LOUIS CHEVROLET.

Witnesses:
WILLIAM PHILLIPS, Jr.,
H. B. SCHERMERHORN.